Feb. 21, 1956 J. B. ORRELL ET AL 2,735,398
CONFECTION MACHINE
Filed Dec. 20, 1952 6 Sheets-Sheet 4

INVENTORS.
Joseph B. Orrell
BY August E. Wilshusen
Albert J. Fihe
ATTORNEY.

Feb. 21, 1956   J. B. ORRELL ET AL   2,735,398
CONFECTION MACHINE

Filed Dec. 20, 1952   6 Sheets-Sheet 5

INVENTORS
Joseph B. Orrell
BY August E. Wilshusen
Albert J. Fihe
ATTORNEY.

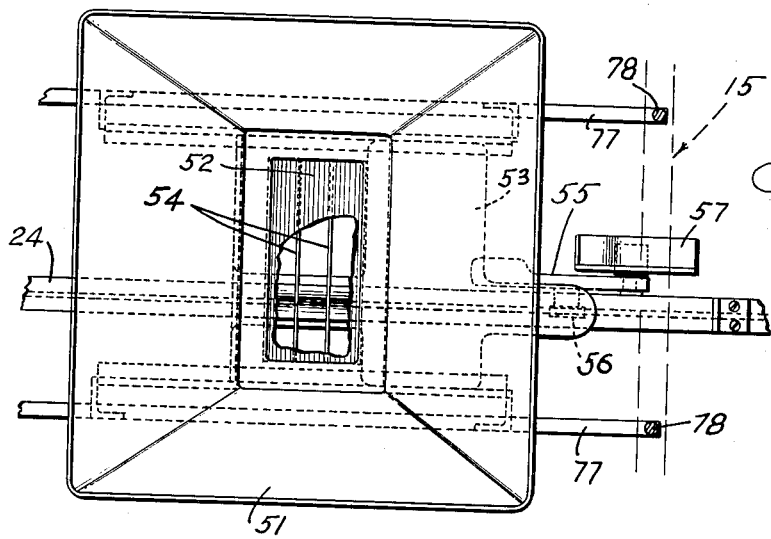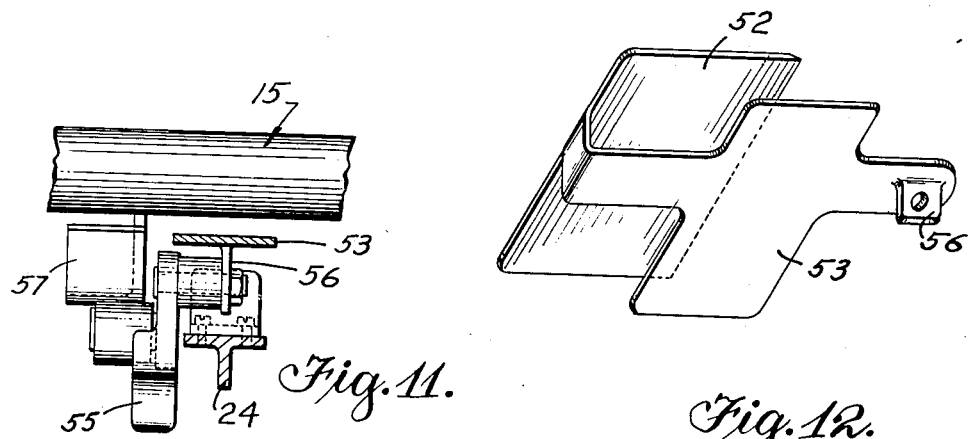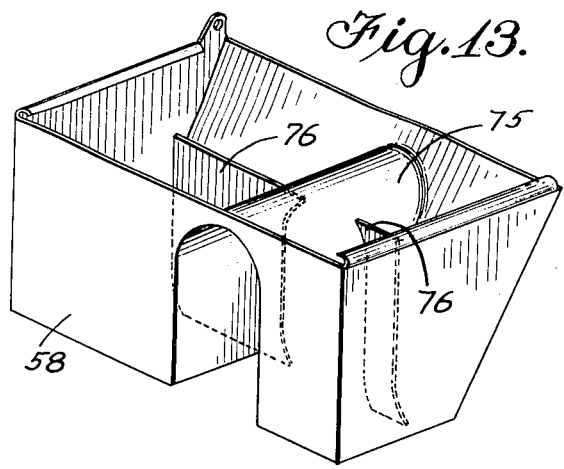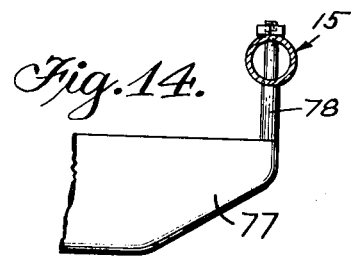

United States Patent Office 2,735,398
Patented Feb. 21, 1956

2,735,398

CONFECTION MACHINE

Joseph B. Orrell, Los Angeles, and August E. Wilshusen, Whittier, Calif., assignors to Drumstick, Inc., Fort Worth, Tex., a corporation of Texas Application December 20, 1952, Serial No. 327,062

4 Claims. (Cl. 118—28)

This invention relates to an improved confection machine and has for one of its principal objects the provision of a modern, sanitary and efficient means for coating the ice-cream of ice-cream cones with chocolate or some similar substance, and then later applying a further coating of ground nuts or the like.

One of the important objects of this invention is to provide an apparatus wherein a selected number of previously prepared ice-cream cones can be placed in a basket-like holder, which is then placed in the machine. The cones are held in the basket in an inverted position, and the ice-cream portion of each cone then has a coating of chocolate automatically applied thereto. This happens while the basket is being held in a pre-determined position in the machine. The basket is then automatically moved to another position in the machine where a coating of nut particles is applied to the still sticky chocolate. Followng this operation, the cones are then automatically released from the basket and packaged.

A still further important object of the invention is to provide, in a device of the class described, means for automatically feeding a pre-determined quantity of nut particles to a hopper and then levelling these particles in the hopper so that when the nut particles are applied to the cones, a certain amount of same will be used, which amount is then automatically replenished during the next operation.

Another and still further important object of the invention resides in the provision of means for cushioning a layer of nut particles whereby, when the coated cones are brought into contact with the nuts, sufficient pressure will be applied to assure that a desired amount of nut particles stick to the coating, while at the same time there is no danger of breakage of the cones themselves, and practically no loss or waste of nuts.

Other and further important objects of the invention will be apparent from the disclosures in the accompanying drawings and following specification.

The invention, in a preferred form, is illustrated in the drawings and hereinafter more fully described.

In the drawings:

Figure 10 is a top view of the nut hopper taken on the line 10—10 of Figure 2 and looking downwardly.

Figure 11 is an enlarged vertical section on the line 11—11 of Figure 2.

Figure 12 is a perspective view of the slidable nut measuring and delivering element which operates in the bottom of the hopper.

Figure 13 is a perspective view of the chute forming the lower part of the nut hopper.

Fig. 14 is a detail view of a portion of one of the hopper supporting elements of the machine.

As shown in the drawings:

Figure 1:
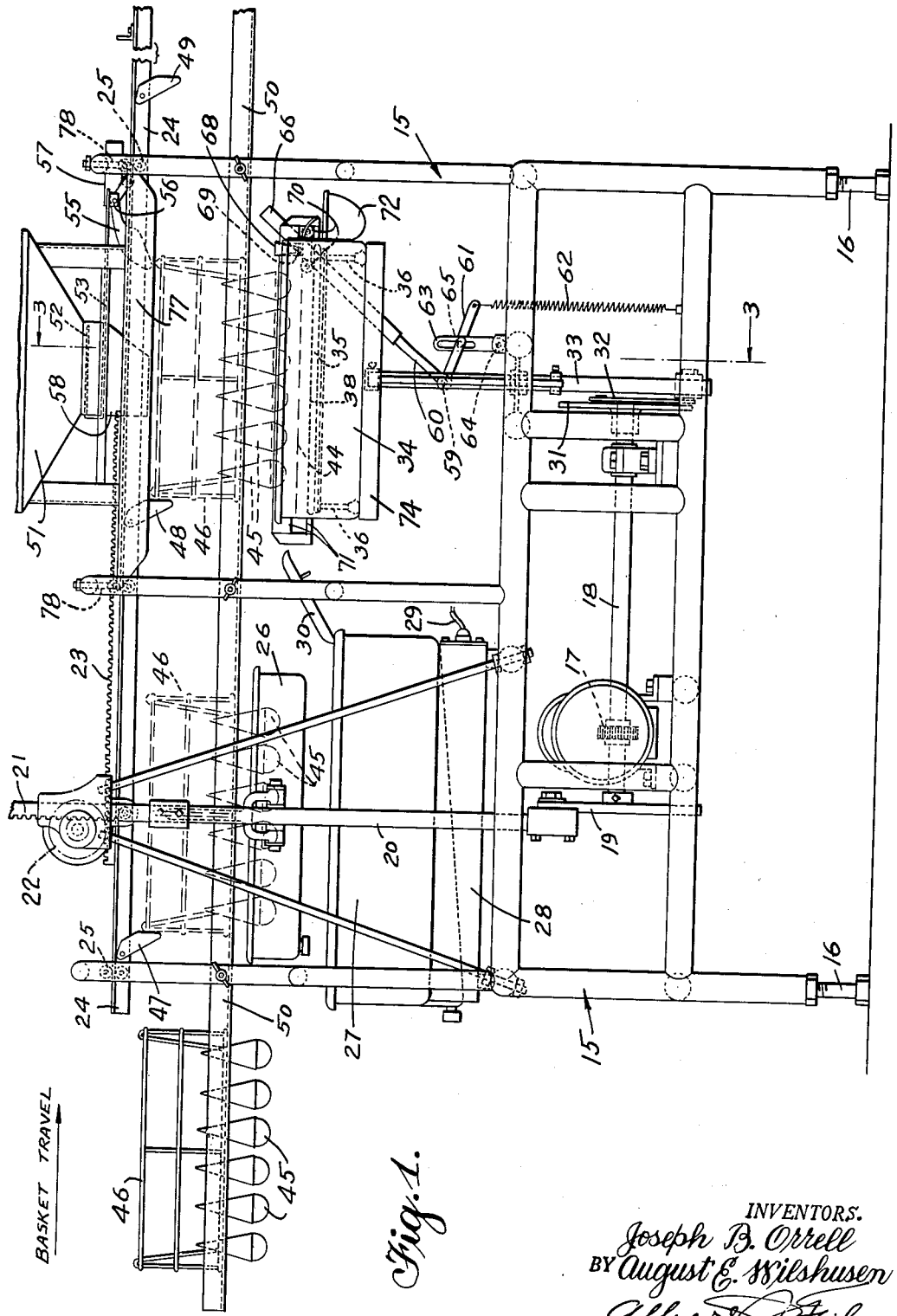
Figure 1 is a side elevation of the improved confection machine of this invention showing three of the important steps in processing the ice-cream cones to be coated.

The reference numeral 15 indicates generally the framework of the improved confection making apparatus of this invention, the same comprising preferably a series of uprights and cross-bars which are mainly tubular as indicated. The effective level of the machine can be adjusted by supporting legs 16. Basket-like holders 46 are provided for the cones 45 which are to be coated.

A motor with reducing gears 17 is mounted in the framework and this in turn drives a shaft 18, having at its inner end a circular plate 19 to which is eccentrically attached a link or rod 20 extending upwardly as best shown in Figure 1. This rod is provided with a rack 21 at its upper end, which, through a system of gears 22, operates another rack 23 which is mounted for a horizontally sliding reciprocation in the top of the machine. This rack is connected to and moves angle-iron elements 24 which are mounted on rollers 25 also at the top of the machine and which rollers provide smooth operation.

Also connected to the shaft 20 is a pan 26 which is adapted to be filled with chocolate in a semi-liquid or creamy state. This pan 26 is moved downwardly into and then upwardly out of a larger pan 27 in which a main supply of chocolate is kept, and which larger pan is maintained at a desired temperature by means of a heating element 28 preferably supplied with current through wires 29. A chute 30 is provided for replenishing the contents of the pan 27 when necessary, and also catches drip.

The other end of the shaft 18 terminates in a circular plate 31 which has a pitman 32 eccentrically mounted thereon. The end of this pitman is connected to a vertically reciprocating shaft 33 at the upper end of which is mounted a pan 34 for containing the nut particles to be applied to the chocolate coated cones. This pan 34 is relatively deep and a rack 35 is set in sealing relationship in the pan, being supported on legs 36. The legs have cushioned resilient feet 37.

Figure 5:
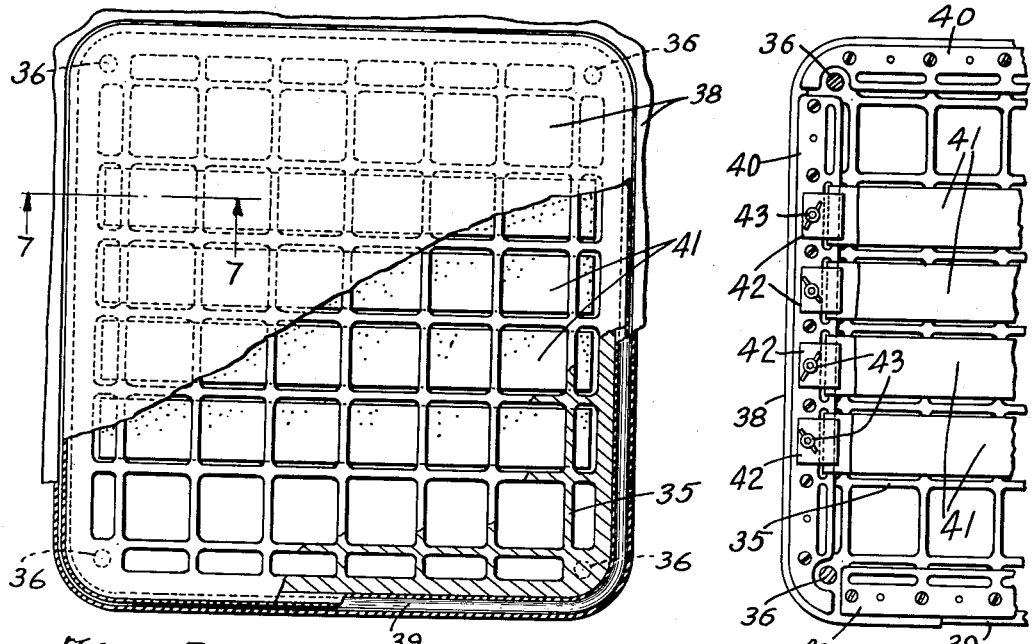
Figure 5 is an enlarged detail view of the nut pan rack itself, parts being broken away to show inner construction.
Figure 6:
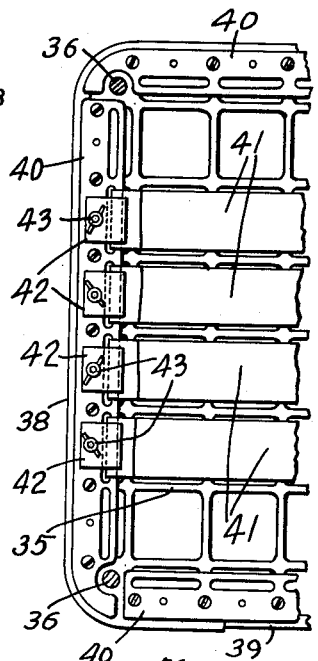
Figure 6 is a detail view of the bottom of one end of the nut pan rack illustrating certain additional resilient nut supports and the means for mounting the same in the rack.

The rack itself is best shown in Figures 5 and 6 and comprises an open frame-work which in the present instance has thirty-six square main openings therein and twenty-four peripheral openings which are smaller. A sheet 38 of resilient material, preferably synthetic rubber, is fastened in position over the top face of the rack, thus being held in place by a surrounding rod 39 (Figure 7), which grips the edges of the sheet being held in place by plates 40.

Figure 7:
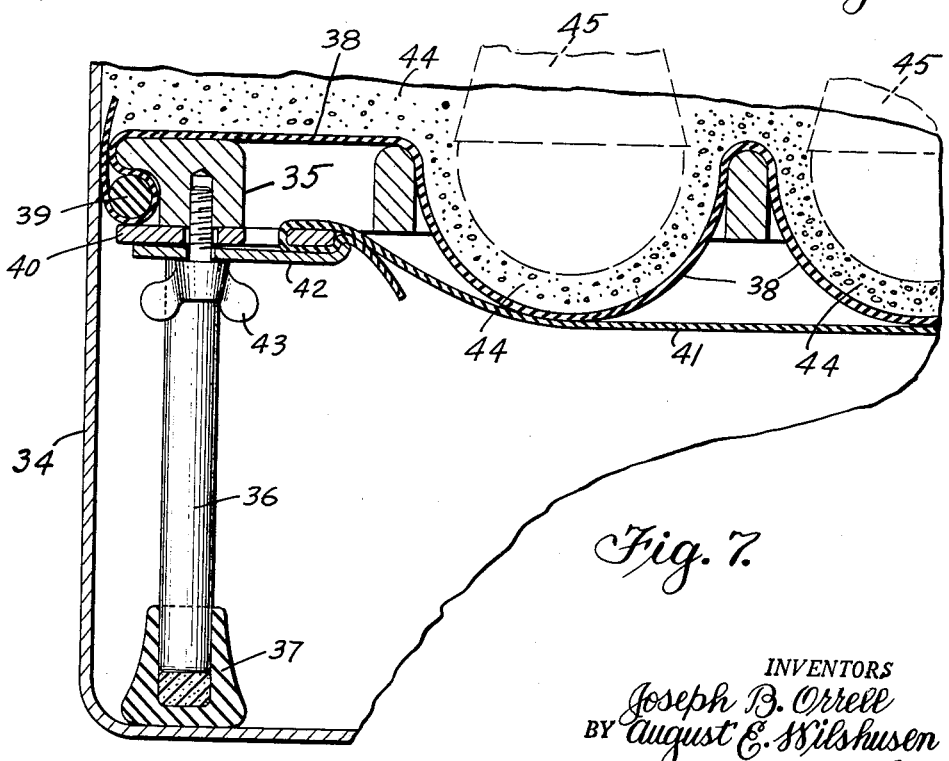
Figure 7 is an enlarged sectional view taken on the line 7—7 of Figure 5, showing the actual step of applying the nut particles to the chocolate coated ice-cream in the cones.

Four strips of rubber similar to the material of the sheet 38 are fastened across the bottom of the rack 35, these strips being best shown at 41 in Figures 6 and 7. These are held in position by plates 42 and a wing bolt 43 fastens both the plates 40 and 42 in rubber sheet and strip holding position. More of these strips may be used if desired or necessary.

The nut particles are indicated at 44, and in operation the pan 34 with the rack full of nuts is pushed upwardly by the rod 33 while the cones 45 in the holder 46 are held in a fixed position over the pan full of nuts. The distance of travel of the pan 34 is adjusted so that sufficient pressure will be applied to the chocolate coated cones by means of the rack 35, rubber sheet 38 and strips 41 acting against the nuts 44 to make a desired quantity of the comminuted nuts adhere to the cone. The resiliency of the sheet 38 and the supporting strips 41 assures of a desired result while at the same time eliminating any danger of breaking or damaging the cones by too much pressure. The cones are retained in their basket holder by small pins which penetrate the material of the cone sufficiently to retain them in position while being coated with chocolate and nuts, and these pins are automatically released when the basket 46 reaches the end of its travel.

The uppermost horizontal rack 23 with the attached angle-irons 24 supports three pawls 47, 48 and 49 and as best shown in Figure 1, a basket holder 46 with supported cones having been placed on the slide supports 50 will be contacted by the first pawl 47 at the extreme end of the movement of the rack 23 and angles 24. The following reverse movement of the rack will push the basket with the cones into position over the pan 26 at which time the pan will move upwardly and the ice-cream of the cones will be coated with chocolate. Upon the downward movement of the rod 20 the smaller pan 26 dips into the chocolate in the larger pan 27 and is automatically refilled.

The basket 46 with the chocolate coated cones 45 is then moved by the next pawl 48 into position over the nut pan 34 and the upward movement of the rod 33 applies the nuts.

Figure 2:
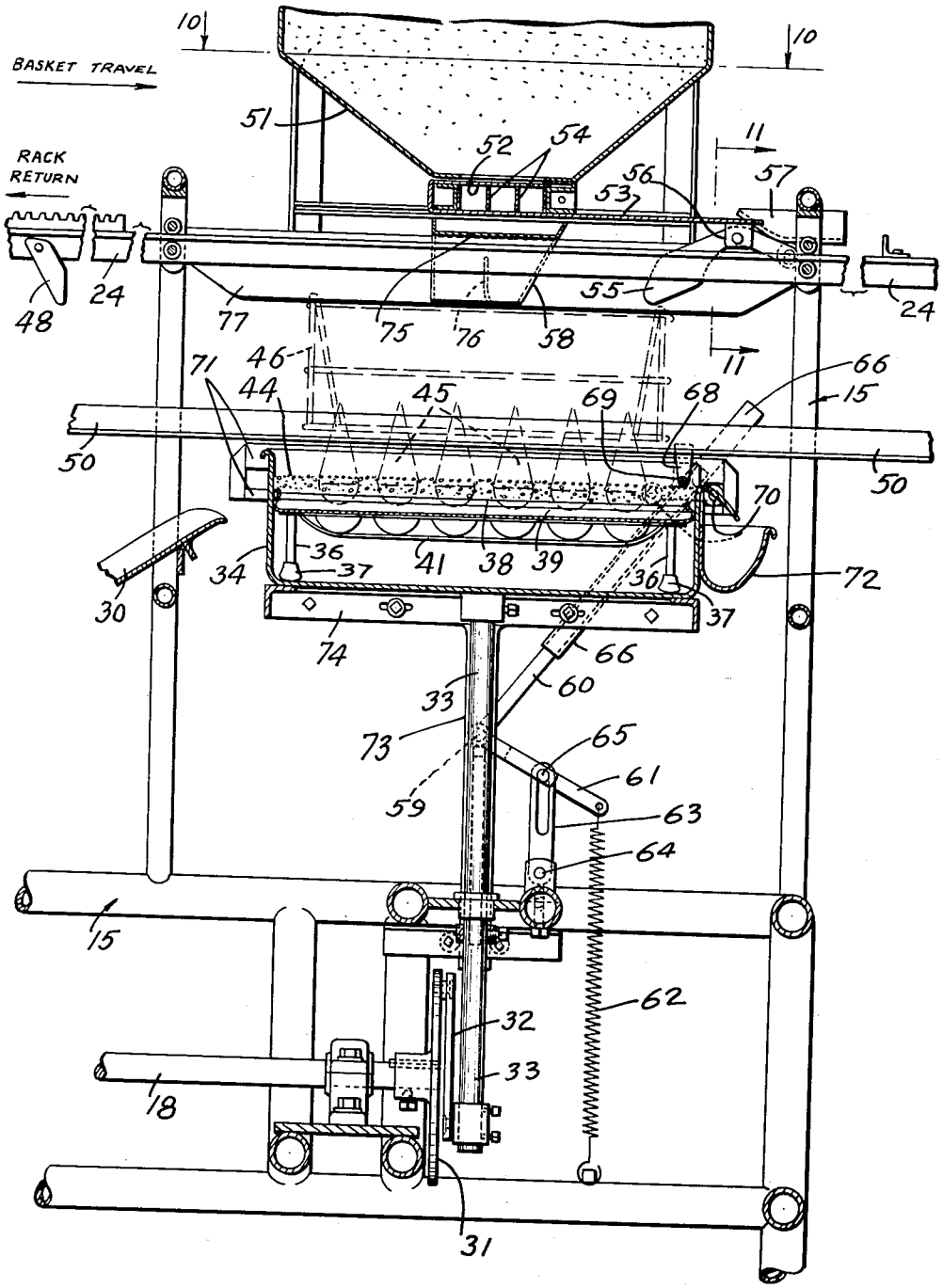
Figure 2 is an enlarged view of one section of the machine, devoted particularly to that portion of the apparatus whereby a final coating of nut particles is applied to the cones, the ice-cream of which has been preliminarily coated with chocolate or some similar substance.
Figure 3:
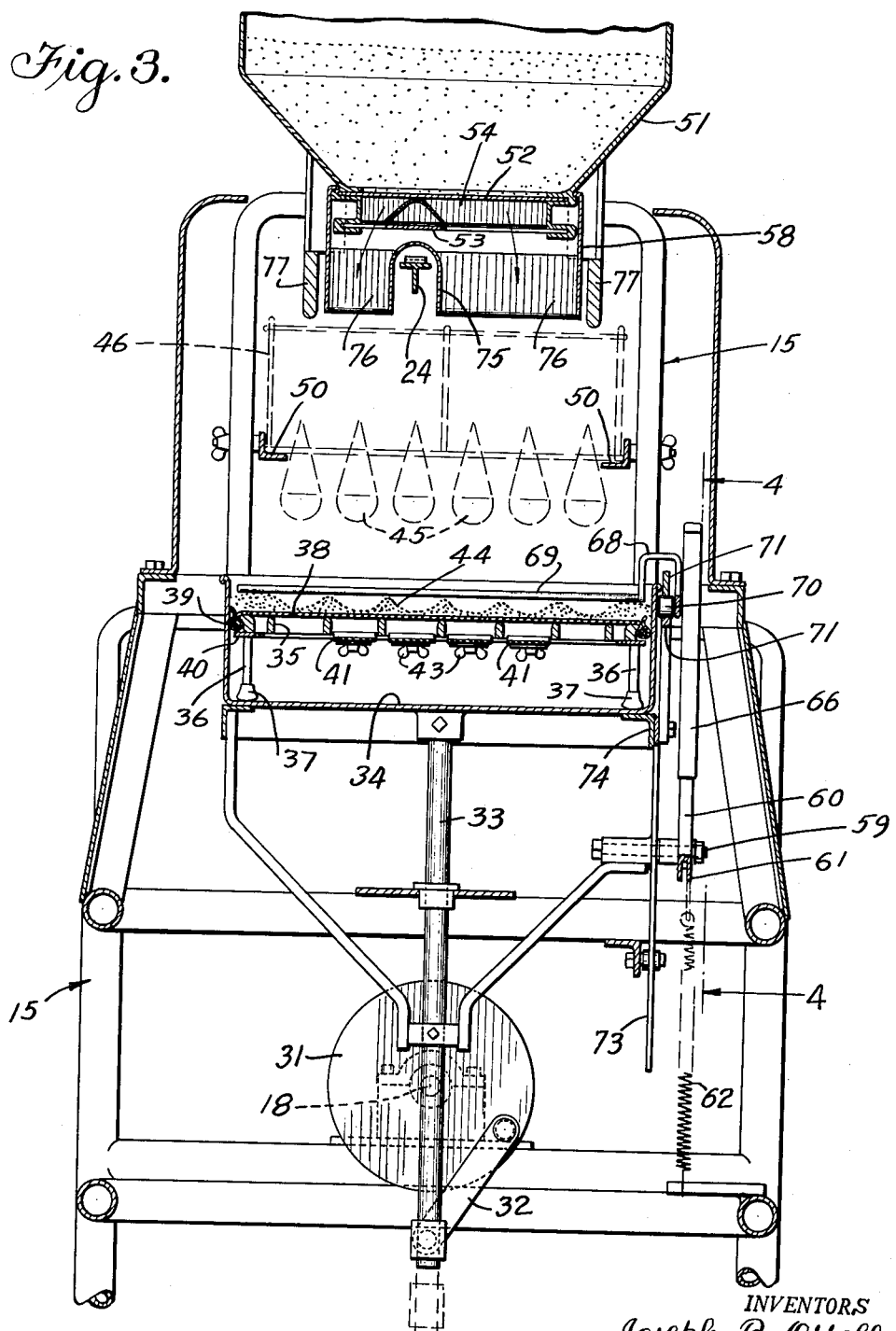
Figure 3 is a vertical sectional view taken on the line 3—3 of Figure 1, showing in more detail the hopper for automatically delivering a measured amount of nuts to the nut pan and also the position of the nuts remaining in the pan subsequent to the nut applying operation.

In order to keep the nut supply replenished, a hopper 51 is provided mounted on the machine above the nut pan 34 as best shown in Figure 2. This is filled with nuts, and a measuring dispensing slide, having upper and lower plate portions 52 and 53, as best shown in Figure 12, is mounted for reciprocating movement beneath the hopper 51. The slide moves across the bottom of partitions 54 which divide the lower end of the hopper into three compartments, and the slide is actuated by movement of the rack 23 and its connected angle 24. This is accomplished by way of a pawl 55 having its central portion pivoted to a depending lug 56 at the end of the plate 53. This pawl has an extension which operates beneath a cam element 57 mounted on the frame 15 of the machine. In this manner, the slide 52—53 is first moved into position to allow nuts from the hopper to enter the compartments defined by the partitions 54, and the next movement reverses this action, causes the plate 53 to move out from under the compartments, and drop the nuts through a chute 58 on to the rubber covered rack 35 while at the same time refilling the measuring compartments. This chute directs the nuts onto desired portions of the rack 35 after which they are levelled so as to be ready for the next operation.

Figure 4:
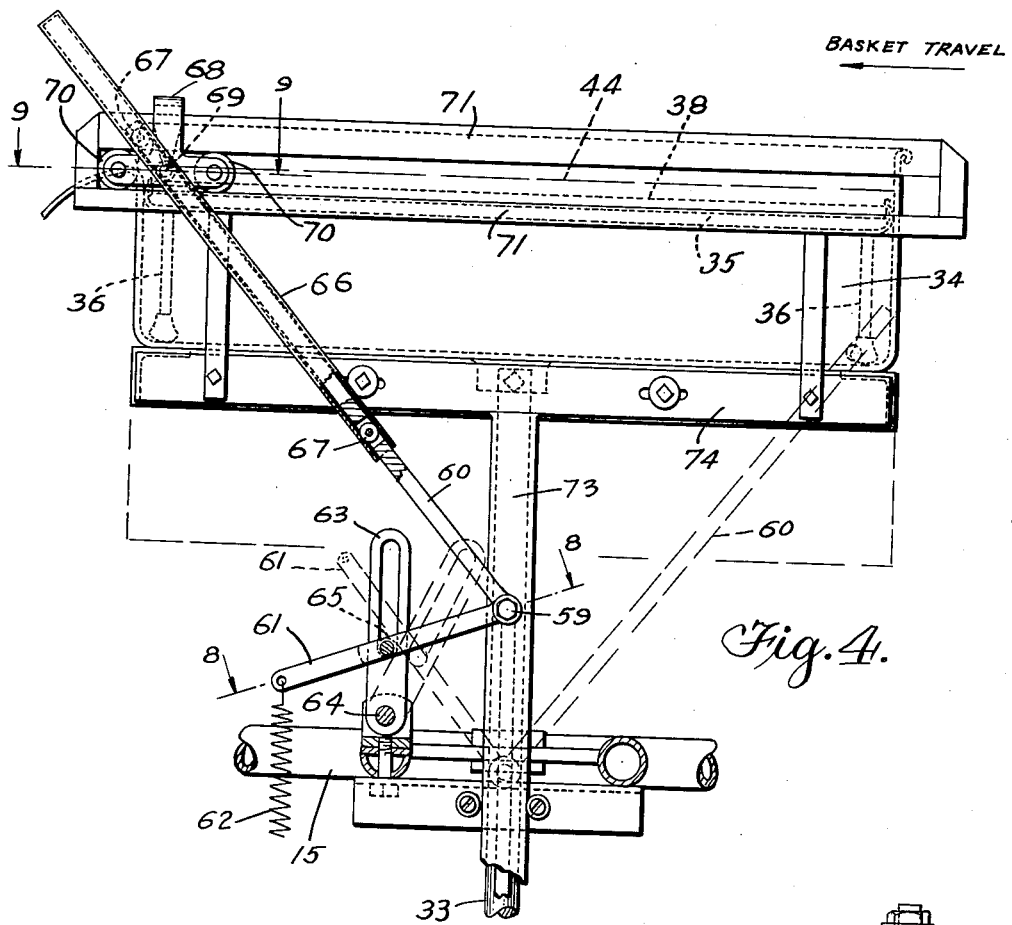
Figure 4 is an enlarged detail view of the nut pan of Figure 3, showing the same as viewed from the reverse side of Figure 2 and as indicated by the section lines 4—4 of Figure 3.
Figure 9:
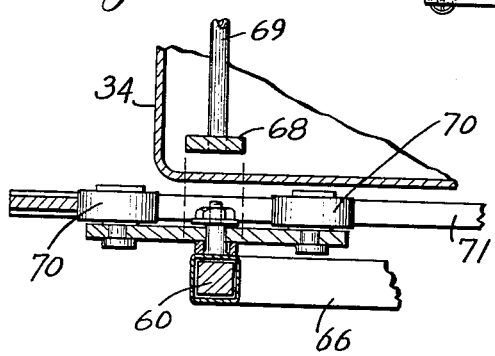
Figure 9 is an enlarged section on the line 9—9 of Figure 4 looking in the direction indicated.
Figure 8:
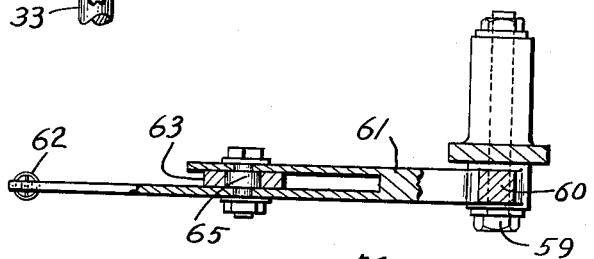
Figure 8 is an enlarged sectional view taken on the line 8—8 of Figure 4, looking in the direction indicated by the arrows.

This levelling means is best illustrated in Figure 4, and comprises a bell-crank pivoted at 59 to the shaft or rod 73. This bell-crank comprises one arm 60 square in cross-section, and another arm 61 to the end of which is fastened a helical spring 62. A slotted upright 63 is pivoted at 64 to the frame 15 and a pin and roller 65 mounted on the arm 61 rides in the slot.

The square tube 66 is slidably mounted on the end of the square shaft 60 and rollers 67 are provided for smoother operation between these two parts.

A U-shaped support is fastened adjacent the outer end of the tube 66 and this extends over the upper edge of the nut bin 34 and thence downwardly thereinto. A levelling rod 69 is fastened to the inner end of this U-shaped element and extends across the nuts 44 which have been dumped onto the rubber sheet 38 on the upper face of the rack 35.

As the rod 33 moves upwardly, the bell-crank 60—61 moves with it and the outer end is constrained to move across the nut pan 34 carrying the levelling rod 69 with it. Rollers 70 are fastened to the U-shaped element 68 and move on roller guides 71 on the outer edge of the pan 34 so that the levelling rod 69 is always at a desired height relative to the nuts on the rack 35 and sheet 38. This regardless of the position of the nut bin 34, as will be evident from the dotted lines in Figure 4. Any excess nuts will be pushed over the edge of the bin 34 and into a receptacle 72 at the forward end thereof as shown in Figure 2.

Partitions 75 and 76 are provided in the nut delivering chute 58 in order to assure that the nut particles will be fairly evenly distributed over the surface of the nut holding rack, thereby making the levelling operation less difficult. The partition 75 also is for the purpose of clearing the angle support 24 and the hopper 51 is supported on brackets 77 fastened to the frame 15 by struts 78.

When the cones in the basket holder 46 have been thus coated with chocolate and nuts, the basket holder with the cones is moved away from the nut bin 34 by the next pawl 49, the nut bin having in the meantime moved downwardly and the completed cones are then ejected from the basket holder by automatically releasing the pins which have in the meantime held them in position. Automatic packaging can be accomplished by dropping the cones through chutes into bags at the end of the chutes.

The entire machine can be covered with a hood of plexiglass, stainless steel or some other material so that human hands will not touch the cones at any time during the entire operation, and they will be free from contamination so far as foreign materials, such as dust and the like, are concerned.

If anything does go amiss during the operation, the machine can be practically immediately halted by shutting off the current to the single motor, after which repairs or adjustments can be readily made.

It will be seen that herein is provided a highly efficient, practically completely automatic and generally satisfactory apparatus for coating ice-cream cones or similar articles with chocolate and then nuts or similar ingredients. The operation is so timed that a basket holder full of cones is moved from one step to another while the chocolate and nut holding pans are in lowered position, which, however, is not simultaneous. Additionally, the operation of the measuring and dispensing means which delivers the nuts and the up and down movement of the chocolate and nut holding pans are so timed that all operations will in no way interfere with any of the others.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. In a confection machine adapted particularly for applying chocolate and comminuted nuts to ice cream cones at separate stations, comprising a framework, continuous rails extending the length of the working portion of the machine, a plurality of ice cream cone holding baskets adapted to be moved through the machine by riding on the rails, means for advancing the baskets in a step-by-step relationship on the rails through the machine, a vertically reciprocable chocolate-holding pan for applying chocolate to the cones in inverted position in one step at the first station, a vertically reciprocable nut holding pan adapted to apply nuts by pressure operation to the chocolate coated cones in said inverted position in a succeeding step at the second station, a single motor for moving the baskets intermittently along the rails, and reciprocating the pans, all in synchronisms, a hopper for the nut particles and a measuring dispenser beneath the hopper and above the nut pan, said measuring dispenser being actuated in timed relationship to the basket moving means, means movable with the nut holding pan to level the nuts delivered thereto from the hopper through the measuring means, said means including a bell-crank, a slotted link connecting one arm of the bell-crank to the machine frame, means for pivoting the bell-crank to the pan moving means, an extension slidable on the other end of the bell-crank, a support on the extension projecting into the nut pan, and a leveling rod on the support, said rod extending across the nut pan.

2. A machine as described in claim 1, wherein rollers and guides are provided on the outside of the nut pan for maintaining the nut levelling rod at a desired level above the nut holding rack during the entire up and down travel of the nut pan.

3. A machine as described in claim 1, wherein a spring connects one arm of the bell-crank to the machine frame.

4. A machine as described in claim 3, wherein the spring is fixed on the end of the same arm which is connected to the slotted link.

References Cited in the file of this patent

UNITED STATES PATENTS

| | | |
|---|---|---|
| 1,294,946 | Pupilla | Feb. 18, 1919 |
| 1,960,456 | Robb | May 29, 1934 |
| 2,124,387 | Taylor | July 19, 1938 |
| 2,245,071 | Elwell | June 10, 1941 |
| 2,347,164 | Petrilli | Apr. 18, 1944 |
| 2,373,721 | Taylor et al. | Apr. 17, 1945 |
| 2,579,696 | Perlman | Dec. 25, 1951 |
| 2,642,029 | Campbell | June 16, 1953 |